Patented Apr. 12, 1938

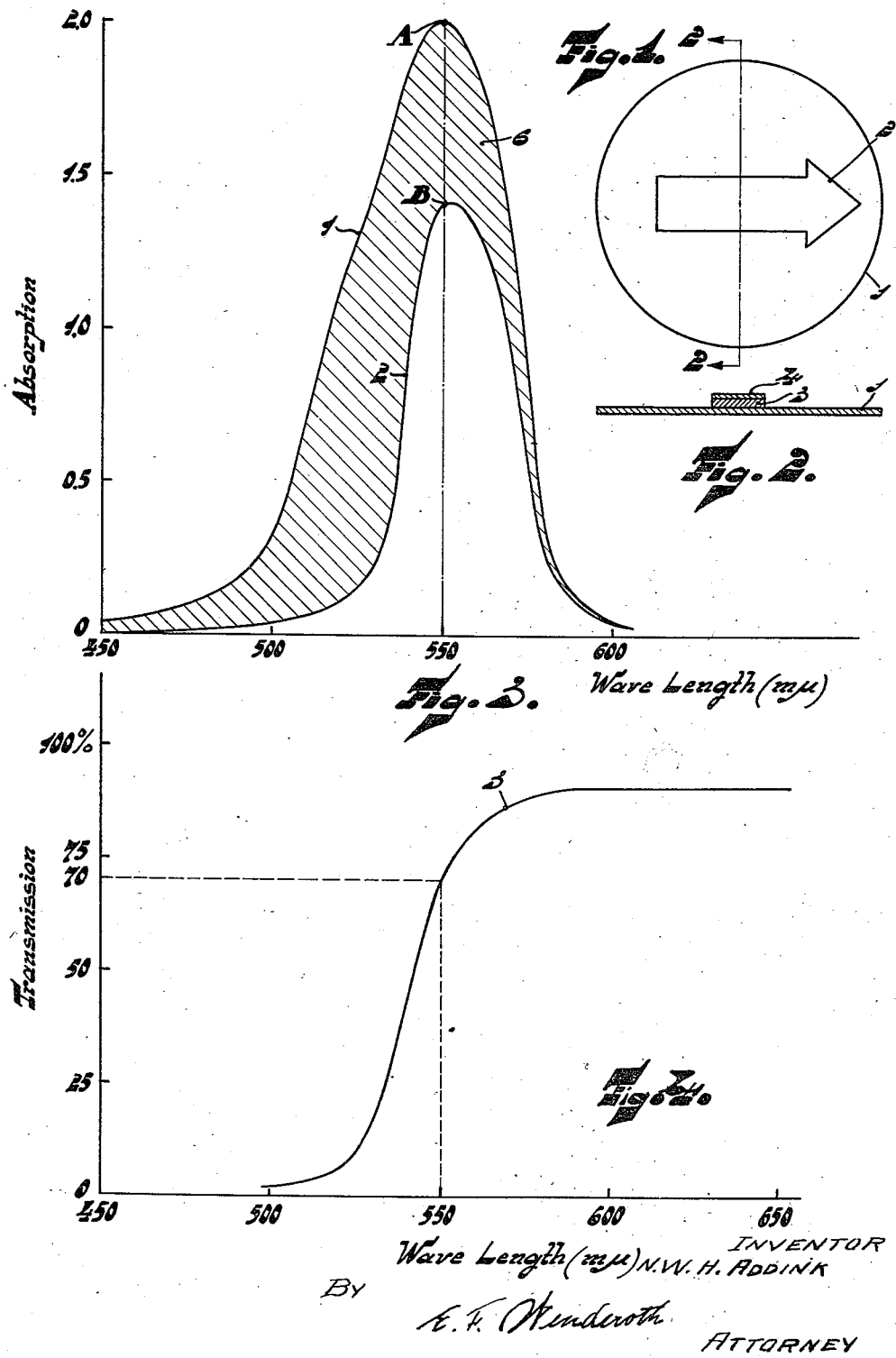

2,113,973

UNITED STATES PATENT OFFICE 2,113,973

RED FLUORESCENT LAYER

Nicolaas Willem Hendrik Addink, Eindhoven, Netherlands, assignor to N. V. Philips' Gloeilampenfabrieken, Eindhoven, Netherlands Application October 22, 1936, Serial No. 107,107. Renewed March 7, 1938. In Germany October, 25, 1935

7 Claims. (Cl. 88—1)

My invention relates to red fluorescent layers, and more particularly to layers containing a red fluorescent rhodamine dyestuff.

On highways illuminated by metal vapor discharge tubes it is advantageous to use signals provided with a layer of red fluorescent dyestuff, as the usual dyestuffs when illuminated for example, by mercury vapor or sodium-vapor discharge tubes produce either an undesired color or no color at all. While red fluorescent rhodamine dyestuffs, produce a distinct red color when radiated by such light, they have the drawback that they are poorly resistant to the action of light and are photochemically decomposed.

Although such photochemical decomposition was generally believed to be due to the action of ultra-violet light, I have found that this dyestuff intensely absorbs a band of light in the visible portion of the spectrum, and that it is the absorption of this light which causes, to a large degree, the decomposition.

While it would appear that this drawback could be overcome in a simple manner by using a light filter to filter out light of the wave-length range of the absorption band or bands of the rhodamine dyestuff, this is not the case, as with such a dyestuff the light filter would absorb light necessary for the generation of the red fluorescence and thus render the layer of rhodamine dyestuff incapable of producing the desired color. To overcome this difficulty quite different methods have been proposed for example, the red fluorescent dyestuff has been dispersed in a condensation product obtained from phthalic acid and a polyvalent alcohol, or from symmetrical diamethylglycol and citric acid. Such methods, however, had the disadvantage that the resistance to the action of light is not satisfying in such a degree as preferred in practice.

The object of my invention is to overcome the above difficulties and to provide a red fluorescent layer which is protected against photochemical decomposition while at the same time it radiates light of the desired color, when illuminated with either natural light or the light of metal-vapor discharge tubes.

My invention, which utilizes the filtering principle, is based upon the fact that the light of all wave lengths within the range of the rhodamine dyestuff absorption band lying in the visible portion of the spectrum, is capable of generating the red light of fluorescence. Thus, theoretically, any light filter that does not absorb all the wave lengths in the above-mentioned range could be combined with a layer of rhodamine dyestuff without depriving this layer of its red-fluorescence capacity.

More particularly, in accordance with the invention I provide the layer containing the red fluorescent rhodamine dyestuff with an orange-colored light filter which absorbs only a portion of the light having wave lengths within the range of the rhodamine dyestuff absorption band lying in the visible part of the spectrum, and which transmits red light. Preferably, the material of the orange-colored filter itself should be capable of resisting photochemical decomposition.

The use of such a filter has the great advantage that a red fluorescent layer of rhodamine dyestuff is rendered much more resistant to the action of daylight, particularly sunlight, while at the same time it produces the desired red-fluorescence when illuminated either by daylight or by artificial light, for example the light of the above-mentioned metal-vapor discharge tubes.

In order that my invention may be clearly understood and readily carried into effect, I shall describe same more fully in connection with the accompanying drawing, in which:

Figure 1 is a view of a signal according to the invention;

Fig. 2 is a sectional view along lines 2—2 of Fig. 1;

Fig. 3 is a graph giving light-absorption curves;

Fig. 4 is a graph giving the light-transmission curve of the filtering layer of Figs. 1 and 2.

The signal shown in Figs. 1 and 2 comprises a metal disc carrying an indicating arrow 2 consisting of a fluorescent layer 3 and a filtering layer 4, each layer having a thickness of about 1 mm.

The fluorescent layer 3 is formed by applying to disc 1 in an acetone solution, a dispersion of rhodamine B in a condensation product obtained from symmetrical dimethylglycol and citric acid; the concentration of the rhodamine dyestuff relative to the condensation product being 0.25%. To increase the fluorescence effect the dispersion may also contain a quantity of lead chromate not exceeding 3%, computed on the condensation product. The filtering layer 4 covers the layer 3 and is applied thereto by means of an acetone solution containing equal quantities by weight of the above-mentioned condensation product and acetone, and 0.2 kilogram per 100 liters of the dyestuff known as methasolaurine A. S.

Instead of methasolaurine A. S., the dyestuff known as orange G may be used; a concentration of 2½ kilograms of this dyestuff per 100 litre of the above-described solution giving with other conditions the same—a 5-fold increase in light durability. In addition, the well-known commercial dyestuff Sudan-orange G may be used as filtering dyestuffs.

Instead of the above-mentioned dispersion mediums, synthetic resins may also be used, for example condensation products obtained from phthalic acid or citric acid with glycerine.

The dyestuffs mentioned above are identified by the following index numbers as given in the well-known "Farbstofftabellen" by Schulz 1931:

| Dyestuff | Index number |
|---|---|
| Rhodamine B | 864 |
| Methasolaurine A. S. | 843 |
| Orange G | 39 |
| Sudan orange G | 33 |

The functioning of the signal shown in Figs. 1 and 2 will be described in connection with Figs. 3 and 4 in which curve 1 shows the variation in the absorption of light in the visible portions of the spectrum by the rhodamine B dyestuff contained in layer 3, if the layer 4 were not present, and curve 2 shows the variation in light-absorption of the rhodamine B dyestuff with the layer 4 in place. Curve 3 indicates the transparency to light of the visible portion of the spectrum of the methasolaurine A. S. having the concentration given for layer 4.

When irradiating the signal by monochromatic light of wave length 550 m$\mu$, a portion of this light is absorbed by layer 4 before reaching layer 3. As seen from Fig. 4, approximately 70% of this light is transmitted through layer 4, and thus layer 3 receives about 70% of the original quantity of this light. This is indicated in Figure 3 by the point B, which lies at about 70% of the height of the point A. Thus curve 2 is obtained by multiplying each ordinate of the curve 1 by the transmission as given by curve 3 for the corresponding wave length. In the case of irradiation by daylight or sunlight, the absorption curve 2 consequently applies for this system. The decrease in absorption of layer 3 for light having wave lengths lying within the visible portion of the spectrum is indicated by the hatched area 6, which is the difference between the area enclosed by curve 1 and the area enclosed by curve 2, and I have found that the durability of the system is increased accordingly.

When irradiating the signal with the light of a sodium-vapor discharge tube or a mercury-vapor discharge tube, however, the desired red fluorescence is not decreased to any appreciable degree because a very large portion of the light emitted by these tubes at 590 m$\mu$ and 540 m$\mu$ respectively is still absorbed by the layer 3 to cause same to emit a large quantity of red-fluorescent light, which passes through the orange-colored filtering layer 4 practically unhampered. For the same reason, the red color of the system of the two layers remains practically unvaried in daylight.

In the example illustrated, the ratio of the area enclosed by curve 2 to the area enclosed by curve 1 is about 1:2 and upon measurement, the light durability of the system of layers was found to have been doubled. When, with the other conditions remaining the same, the methasolaurine A. S. dyestuff was used in a concentration of 0.7 kilogram per 100 litre, the above ratio became 1:3, whereas the light durability was found experimentally to have been increased three times.

While I have described my invention in connection with specific applications and examples, I do not wish to be limited thereto, but desire the appended claims to be construed as broadly as permissible in view of the prior art.

What I claim is:—

1. A body having red fluorescent properties comprising a fluorescent layer containing a red fluorescent rhodamine dyestuff and a filtering layer containing an orange-colored filtering substance having the properties of transmitting red light and of absorbing a portion of the light whose wave lengths are within the range of the rhodamine dyestuff absorption band lying within the visible portion of the spectrum.

2. A body having red fluorescent properties comprising a fluorescent layer containing a red fluorescent rhodamine dyestuff, and a filtering layer containing methasolaurine A. S. dyestuff.

3. A body having red fluorescent properties comprising a fluorescent layer containing a red fluorescent rhodamine dyestuff and a filtering layer containing an orange-colored filtering substance having the properties of transmitting red light and of absorbing a portion of the light whose wave lengths are within the range of the rhodamine dyestuff absorption band lying within the visible portion of the spectrum, the area enclosed by the light-absorption curve of said dyestuff being more than twice the area enclosed by a curve obtained by multiplying the ordinates of said light-absorption curve by the ordinates of the light-transmission curve of the filtering layer.

4. In combination, a red fluorescent layer containing a red fluorescent rhodamine dyestuff, and a filtering layer containing an orange-colored filtering substance having the properties of transmitting red light and of absorbing a portion of the light whose wave lengths are within the range of the rhodamine dyestuff absorbing band lying within the visible portion of the spectrum.

5. A red fluorescent indicating body adapted to be radiated by the light of a mercury-vapor discharge tube comprising a fluorescent layer containing a red fluorescent rhodamine dyestuff, and a filtering layer containing an orange-colored filtering substance having the properties of transmitting red light and of absorbing a portion of the light whose wave lengths are within the range of the rhodamine dyestuff absorption band lying within the visible portion of the spectrum.

6. A red fluorescent body adapted to be radiated by the light of a sodium vapor discharge tube comprising a fluorescent layer containing a red fluorescent rhodamine dyestuff and a filtering layer containing an orange-colored filtering substance having the properties of transmitting red light and of absorbing a portion of the light whose wave lengths are within the range of the rhodamine dyestuff absorption band lying within the visible portion of the spectrum.

7. A body having red fluorescent properties comprising a fluorescent layer containing a red fluorescent rhodamine dyestuff, and a filtering layer containing an orange-colored filtering dyestuff selected from the group consisting of methasolaurine A. S., orange G, and Sudan-orange G.

NICOLAAS WILLEM HENDRIK ADDINK.